US012400440B2

(12) United States Patent
Marvasti et al.

(10) Patent No.: US 12,400,440 B2
(45) Date of Patent: Aug. 26, 2025

(54) COOPERATIVE LIDAR OBJECT DETECTION VIA FEATURE SHARING IN DEEP NETWORKS

(71) Applicant: University of Central Florida Research Foundation, Inc., Orlando, FL (US)

(72) Inventors: Ehsan Emad Marvasti, Orlando, FL (US); Arash Raftari, Orlando, FL (US); Yaser Pourmohammadi Fallah, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 450 days.

(21) Appl. No.: 17/928,473

(22) PCT Filed: Jun. 11, 2021

(86) PCT No.: PCT/US2021/037054
§ 371 (c)(1),
(2) Date: Nov. 29, 2022

(87) PCT Pub. No.: WO2021/252925
PCT Pub. Date: Dec. 16, 2021

(65) Prior Publication Data
US 2023/0267720 A1    Aug. 24, 2023

Related U.S. Application Data

(60) Provisional application No. 63/038,448, filed on Jun. 12, 2020.

(51) Int. Cl.
*G06V 10/82* (2022.01)
*G01S 17/89* (2020.01)
(Continued)

(52) U.S. Cl.
CPC .............. *G06V 10/82* (2022.01); *G01S 17/89* (2013.01); *G06T 7/73* (2017.01); *G06V 20/56* (2022.01);
(Continued)

(58) Field of Classification Search
CPC ........ G06V 10/82; G06V 20/56; G06V 10/42; G01S 17/89; G01S 7/4802; G01S 7/4808;
(Continued)

(56) References Cited

U.S. PATENT DOCUMENTS

2019/0384304 A1    12/2019  Towal et al.
2020/0098135 A1*    3/2020  Ganjineh ........... G01C 21/3811

FOREIGN PATENT DOCUMENTS

EP           3798665    *  3/2021    ............. G01S 13/87

OTHER PUBLICATIONS

Search Report and Written Opinion for PCT/US2021/037054, dated Nov. 4, 2021, 18 pgs.

* cited by examiner

*Primary Examiner* — Jerome Grant, II
(74) *Attorney, Agent, or Firm* — Anton J. Hopen; Smith & Hopen, P.A.

(57) ABSTRACT

Situational awareness as a necessity in connected and autonomous vehicles domain is a subject of significant research in recent years. The driver's safety is directly dependent on robustness, reliability and scalability of such systems. Cooperative mechanisms have provided a solution to improve situational awareness by utilizing communication networks. These mechanisms mitigate problems such as occlusion and sensor range limitation. However, the network capacity is a factor determining the maximum amount of information being shared among cooperative entities. A focus of this work is to reduce the network capacity require- (Continued)

ments while maintaining the desirable object detection performance by utilizing and modifying the concept of feature sharing. Described here is a mechanism to further improve object detection performance by utilizing novel decentralized parallel frameworks and a new shared data alignment method to allow parallel and cooperative processing of sensed data in multiple locations yielding significant improvements.

24 Claims, 8 Drawing Sheets

(51) Int. Cl.
*G06T 7/73* (2017.01)
*G06V 20/56* (2022.01)
(52) U.S. Cl.
CPC ............... *G06T 2207/10028* (2013.01); *G06T 2207/20081* (2013.01); *G06T 2207/20084* (2013.01); *G06T 2207/30252* (2013.01)
(58) Field of Classification Search
CPC ......... G01S 17/87; G01S 17/931; G06T 7/73; G06T 2207/10028; G06T 2207/20081; G06T 2207/20084; G06T 2207/30252; G06T 2200/04; G06T 2207/10016; G06T 2207/30244; G06T 7/33; G01C 21/3848
USPC ........................................................ 382/155
See application file for complete search history.

COOPERATIVE LIDAR OBJECT DETECTION VIA FEATURE SHARING IN DEEP NETWORKS

STATEMENT REGARDING FEDERALLY SPONSORED RESEARCH OR DEVELOPMENT

This invention was made with Government support under Grant #1664968 awarded by the National Science Foundation. The Government has certain rights in this invention.

BACKGROUND OF THE INVENTION

Various embodiments relate generally to object detection systems, methods, devices and computer programs and, more specifically, relate to object detection by cooperative vehicles sharing data from light detection and ranging (LIDAR) sensors.

This section is intended to provide a background or context. The description may include concepts that may be pursued, but have not necessarily been previously conceived or pursued. Unless indicated otherwise, what is described in this section is not deemed prior art to the description and claims and is not admitted to be prior art by inclusion in this section.

Failings in prior art: In computer vision, the performance of object detection degrades in areas where the view of an object is either (partially) obstructed or is of low resolution. The remedy is to communicate sensed data from another observer, or the result of detection from that other observer. The first method is very costly, while the second method does not fully resolve the issue. The scheme allows both observers to perform better than what they would do on their own.

Due to recent advancement in computation systems, many high performing and relatively fast Convolutional Neural Network (CNN) based object detection methods have gained attention. Despite of these advancements, none of the aforementioned methods can overcome the challenge of non-line-of-sight or partial occlusion if they are utilized in single-vehicle object detection setup. Also, Concepts such as collective perception messages, proposed to address the aforementioned challenges, might cause other problems such as lack of consensus in inferences of cooperative vehicles.

What is needed is a method to increase the performance of object detection while decreasing the required communication capacity between cooperative vehicle in order to help cooperative safety applications to be more scalable and reliable.

BRIEF SUMMARY OF THE INVENTION

The below summary is merely representative and non-limiting.

The above problems are overcome, and other advantages may be realized, by the use of the embodiments.

In a first aspect, an embodiment provides a method for object detection by cooperative vehicles sharing data. The method includes aligning point-clouds obtained by a sensor device with respect to a vehicles' heading and a predefined global coordinate system. After the point-clouds are globally aligned with respect to rotation, the BEV projector unit (or point cloud to 3D tensor projector) is used to project the aligned point-clouds onto a 2D/3D image plane. A BEV image/tensor is generated having one or more channels and each channel provides the density of reflected points at a specific height bin. Information embedded in features determine a vector indicating the relative locations and orientations of objects with respect to the observer in addition to class and confidence of object detection. Fixels, which represent pixels produced in feature-maps, are generated. Each fixel in a feature-map represents a set of pixel coordinates in an input image and consequently represents an area of the environment in global coordinate, the BEV image/tensor is padded/shifted so the fixels represent a predetermined range of global coordinates due to applying Translation Mod Alignment on BEV images/tensors prior to be fed to the neural network. After Translation Mod Alignment, the mod-aligned BEV image is fed into a CNN to acquire the feature-map of the surrounding environment. The method also includes using a CNN encoder to project and/or compress transmitter vehicle feature maps onto a lower dimension for transmission and using a decoder on a receiver side to project the received compressed feature-maps to FEC feature-space. At an ego-vehicle, a coop-vehicle's feature-map is decoded and the coop-vehicle's feature-map is aligned with respect to an ego-vehicle local coordinate system and accumulating with ego-vehicle's feature-map. After decoding and globally aligning the received feature-map, the ego-vehicle's and aligned coop-vehicle's feature-maps are accumulated by an element-wise summation. The method also includes feeding the resulting accumulated feature-map into an object detection CNN module to detect the targets in the environment.

In a further aspect, an embodiment provides a method of training a network to improve cooperative perception (CVT). The method includes receiving time synchronized observations from at least two cooperative vehicles. The time synchronized observations are fed to the network to produce a feature map. The method also includes calculating gradients with respect to aggregation of the feature map with respect to all the time synchronized observations.

In another aspect, an embodiment provides a method of cooperative object detection. The method includes performing cooperative object detection in a feature sharing scheme using a decentralized alignment procedure introduced as Translation Mod Alignment. The method also includes performing an alignment on an input image or point cloud by one of: padding and shifting the input image.

BRIEF DESCRIPTION OF THE SEVERAL VIEWS OF THE DRAWINGS

Aspects of the described embodiments are more evident in the following description, when read in conjunction with the attached Figures.

FIGS. 5a-5c, collectively called FIG. 5, show (a) an illustration of CARLA work-space in an arbitrary scenario; (b) a Point-cloud generated from LIDAR device of a cooperative vehicle and (c) a BEV representation of the point-cloud.

FIGS. 9a-9b, collectively called FIG. 9, show Precision and recall curves for various detection systems.

DETAILED DESCRIPTION OF THE INVENTION

This patent application claims priority from U.S. Provisional Patent Application No. 63/038,448, filed Jun. 12, 2020, the disclosure of which is incorporated by reference herein in its entirety.

Various embodiments provide an approach of "cooperative cognition" by sharing partially processed data ("feature sharing") from LIDAR sensors amongst cooperative vehicles. The partially processed data are the features derived from an intermediate layer of a deep neural network, and the results show that the approach significantly improves the performance of object detection while keeping the required communication capacity low compared to sharing raw information methods. These approaches increase the performance of object detection while decreasing the required communication capacity of the cooperative vehicles which helps cooperative safety application to be more scalable and reliable. A similar approach may also be used in other sensor processing applications using neural networks, in which there may be more than one observer of the scene. For example, environment perception in connected and autonomous vehicle applications.

A decentralized parallel framework may be used to improve object detection performance while considering the vehicular network bandwidth limitation via feature-sharing between cooperative vehicles equipped with LIDAR.

Contrary to the conventional methods, various embodiments incorporate a concept of feature sharing and a new object detection framework, feature sharing cooperative object detection (FS-COD), based on this concept as a solution to partial occlusion, sensor range limitation and lack of consensus challenges. Object detection performance is enhanced by introducing two new shared data alignment mechanisms and a novel parallel network architecture. The new architecture significantly reduces the required communication capacity while increasing the object detection performance. In general, any CNN based object detection method is distinguished by optimization cost functions, network architecture and input representation. In this framework, the object detection component was designed by adapting a loss function, similar to single-shot object detectors such as You Only Look Once (YOLO), while the input representation and network architecture are different.

In connected and autonomous vehicle (CAV) domain, using bird-eye view (BEV) projection of point-clouds as data representation has gained popularity due to the nature of the input data, e.g., the target objects are vehicles or pedestrians that lie on a surface such as road or sidewalk. Similar to previous frameworks, BEV projection is used due to its merits in this specific application. BEV projection significantly reduces the computational cost while keeping the size of target objects invariant to their distances from the observer (sensory unit).

In order to evaluate the performance of the framework, a Complex-YOLO CNN backbone structure has been modified to exploit this specific characteristic of BEV projection and considered its results as one of the baselines. The modification detail is provided below. In addition, the results of FS-COD was considered as the second baseline.

Figure 2A:
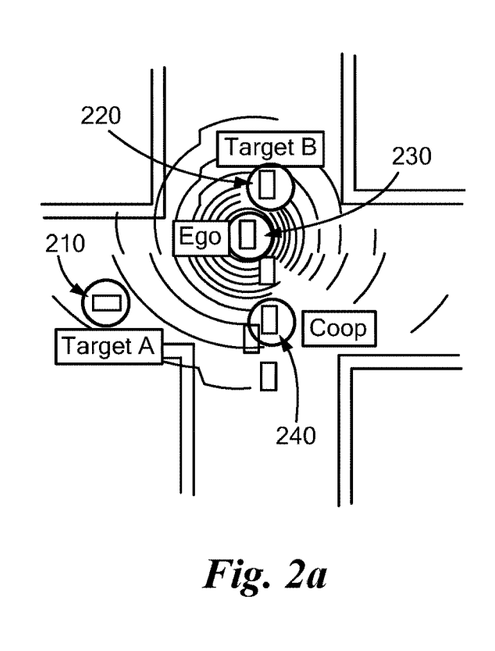
FIGS. 2a-2c, collectively called FIG. 2, demonstrate a comparison between performance of single vehicle object detection and feature sharing based object detection methods in an arbitrary scenario.
Figure 2B:
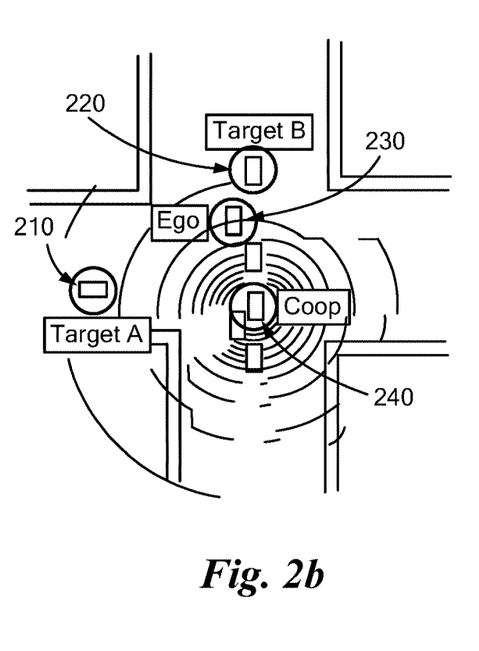
Figure 2C:
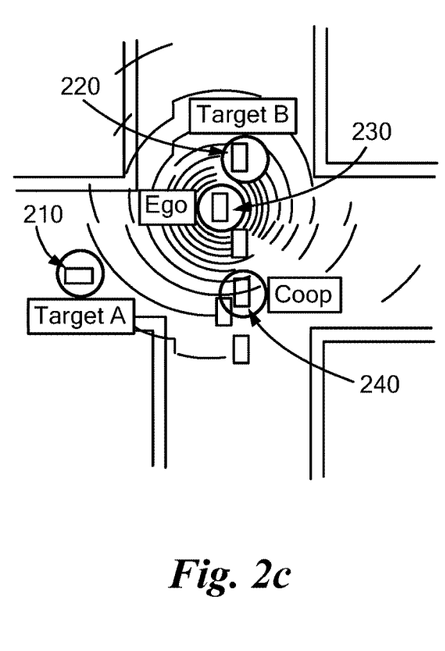

FIG. 2 shows a comparison between performance of single vehicle object detection and feature sharing based object detection methods. A scenario is shown in which, target A 210 is not detectable by either vehicles 230, 240 and there is a lack of consensus on target B 220 between cooperative vehicles if they rely solely on their own sensory and inference units. However, target A 210 is detectable if adaptive feature sharing cooperative object detection (AFS-COD) is applied and the lack of consensus on target B 220 is solved.

A. AFS-COD Architecture

In this section, input data representation, AFS-COD architecture and the training procedure are discussed in detail.

Figure 1:
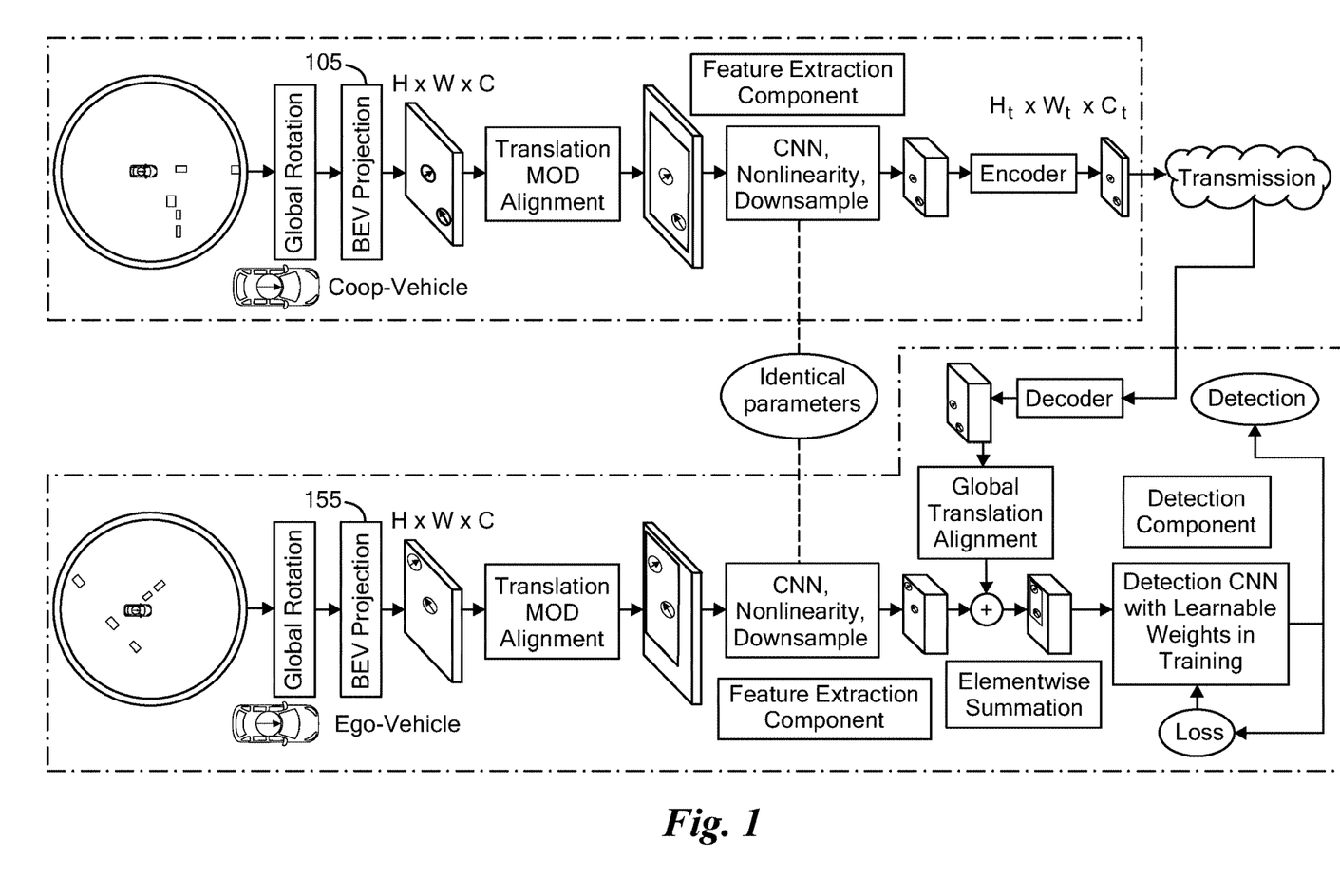
FIG. 1 illustrates the overview of feature sharing procedure.

FIG. 1 demonstrates the overview of AFS-COD framework. In this setup, each cooperative vehicle 105 is equipped with LIDAR as a sensory unit and a GPS device for reading their position information. Therefore, the observations (input data) are the point-clouds generated from the sensory unit. Additionally, cooperative vehicles 105 share the partially processed information (features) along the metadata containing their positioning information. The AFS-COD architecture for each participating cooperative vehicle 105 consists of BEV projector function, feature extractor CNN structure, an encoder and a decoder CNN network, feature accumulator and an object detection CNN module along with global rotation, Translation Mod Alignment and global translation alignment procedures. The entire AFS-COD procedures are described in a sequential manner in the remainder of this section.

1) Global Rotation Alignment: A purpose of feature sharing concept is to enable participating entities to combine corresponding features extracted separately by cooperative vehicles. In order to achieve this goal, the extracted feature-maps should be aligned before being combined. The information embeded in features determine the vector indicating the relative locations and orientations of objects with respect to the observer (cooperative vehicle). Hence, the first step in AFS-COD is to align the point-clouds obtained by LIDAR device with respect to vehicles' heading and a predefined global coordinate system. The alignment is done by considering a global coordinate system for all cooperative entities and rotate vehicles' point clouds represented in local ego coordinate systems with respect to the global coordinate system. The global rotation alignment formulation is as follows":

$$X_w = X_e R_x(\alpha) R_y(\beta) R_z(\gamma) \qquad (1)$$

where $X_w$ and $X_e$ are representations of a point in the global and local coordinate systems respectively. $R_x$, $R_y$ and $R_z$ are the rotation matrices for x, y and z axis.

2) BEV Projection: As discussed above, the two-dimensional (2D) images, obtained by BEV projection of LIDAR point-clouds, are fed to neural networks as input data. After the generated point-clouds are globally aligned with respect to rotation, BEV projector unit projects the aligned LIDAR point-clouds onto 2D image plane. In this projection method, the BEV image has three (3) channels and each channel provides the density of reflected points at a specific height bin. The height bins may be defined as arbitrary chosen numbers, such as, [−∞, 2m], [2m, 4m] and [4m, ∞]; however, the height bin specification can be changed in response to the dataset to achieve a better result.

3) Translation Mod Alignment: Although Global Rotation and Translation alignments can enable feature-maps produced by cooperative entities to be accumulated, Global Translation Alignment does not consider inconsistencies caused by down-sampling the input image. In this section, the problem in translation alignment arising from down-sampling followed by the Translation Mod Alignment method are described. A pixel in feature map is referred to as a "fixel" to highlight a distinction between the pixels of the input image and pixels of the feature-maps.

Figure 3:
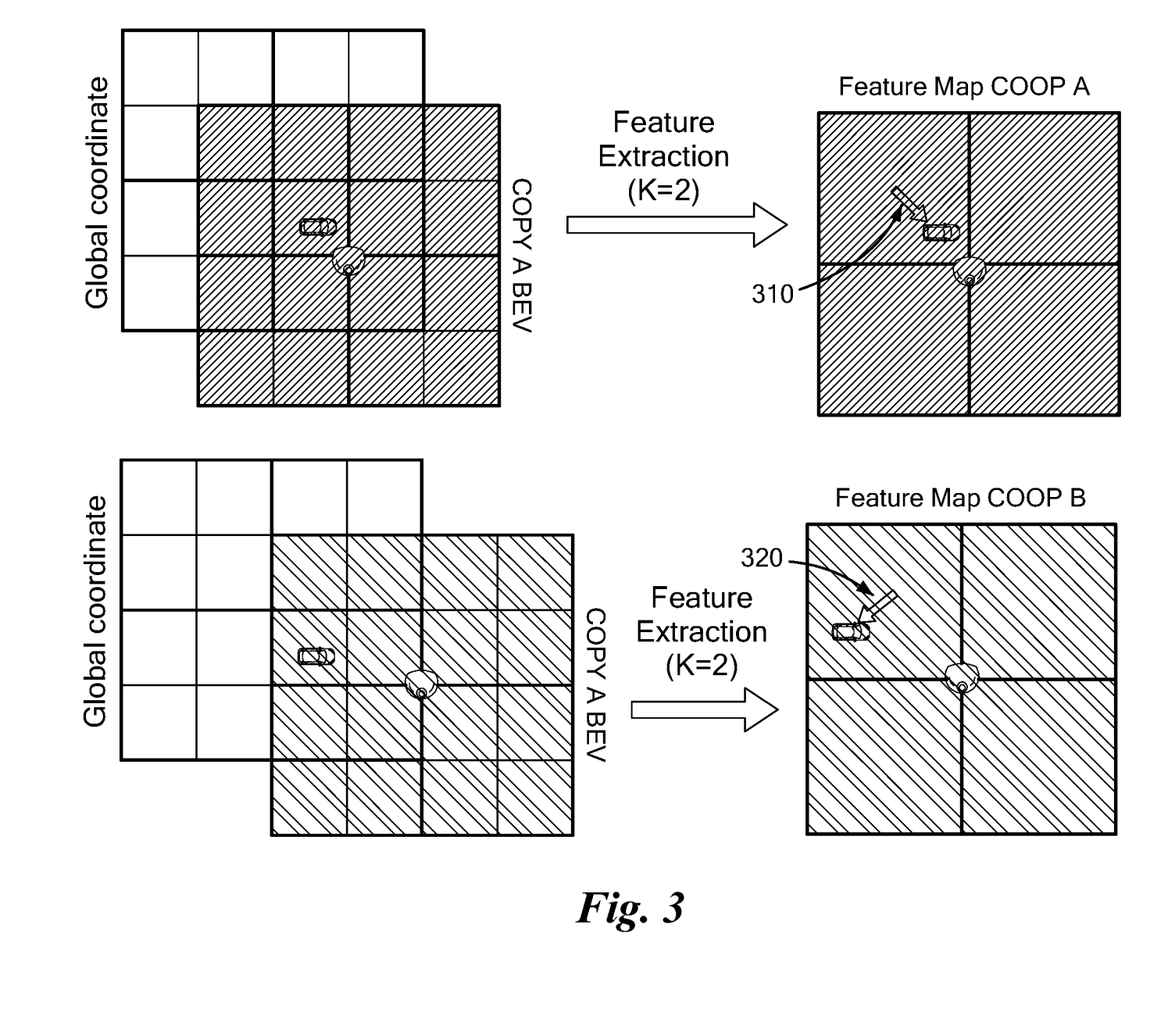
FIG. 3 is an illustration of the effect of down-sampling on alignment.

Each fixel value is the output of a non-linear function on a set of pixels in input image. Therefore, each fixel in feature-map represents a set of pixel coordinates in input image and consequently represents an area of the environment in global coordinate. In FS-COD, the transmitted feature-maps are aligned with respect to cooperative vehicles coordinates in Global Translation alignment component. Two sets of pixel coordinates represented by corresponding aligned fixels, acquired by cooperative vehicles, may not exactly match. Generally, a fixel contains information leading to construction of a vector toward the center of an object in the area represented by the fixel. If corresponding fixels acquired from both cooperative parties do not correspond to the same area in global coordinate, the information of such feature-pixels are not fully compatible and accumulating them by an element-wise summation can decrease the performance of object detection. FIG. 3 provides an example where down-sampling causes pixel misalignment. We can observe that the same fixel coordinate can represent different pixels by changing the location of cooperative vehicle. Therefore the vectors resulting from the same fixel can vary based on the pixel coordinates they represent.

To resolve the issue, first, consider that the cooperative vehicle may not have access to the location of the ego-vehicle. If that information was available it could have aligned the cooperative vehicle's BEV image with the ego-vehicle. Since such information may not be used to mitigate the misalignment, Translation Mod Alignment is used as the alternative solution. The Translation Mod Alignment procedure solves the problem without considering the ego-vehicle location. In this method the input image is padded so each produced fixel represents a predetermined area of a global coordinate. In other words, the image is padded with zero values in order for a fixel with coordinate $(\hat{x}, \hat{y})$ to represent pixels with global coordinates in the range of $[K \hat{x}, K \hat{x}+K] \times [K \hat{y}, K \hat{y}+K]$. where K is the down-sampling rate from input image to feature-map.

The input BEV image represents global pixels coordinates within the range of $[x_0, x_1] \times [y_0, y_1]$ which can be rewritten in terms of fixel coordinates as $[\hat{x}_0 K+\alpha_0, \hat{x}_1 K+\alpha_1] \times [\hat{y}_0 K+\beta_0, \hat{y}_1 K+\beta_1]$ where $\alpha_i, \beta_i \geq 0$ and $\alpha_i, \beta_i < K$, $\hat{x}_1 > \hat{x}_0$ and $\hat{y}_1 > \hat{y}_0$. Therefore the image is padded to represent the range $[K \hat{x}_0, K \hat{x}_1+K] \times [K \hat{y}_0, K \hat{y}_1+K]$ in global pixel coordinates. The image is padded along the both axis by using a mod function.

$$p_l \equiv x_0 \bmod K \quad (2)$$

$$p_r \equiv (-x_1) \bmod K \quad (3)$$

$$p_t \equiv y_0 \bmod K \quad (4)$$

$$p_b \equiv (-y_1) \bmod K \quad (5)$$

Figure 4:
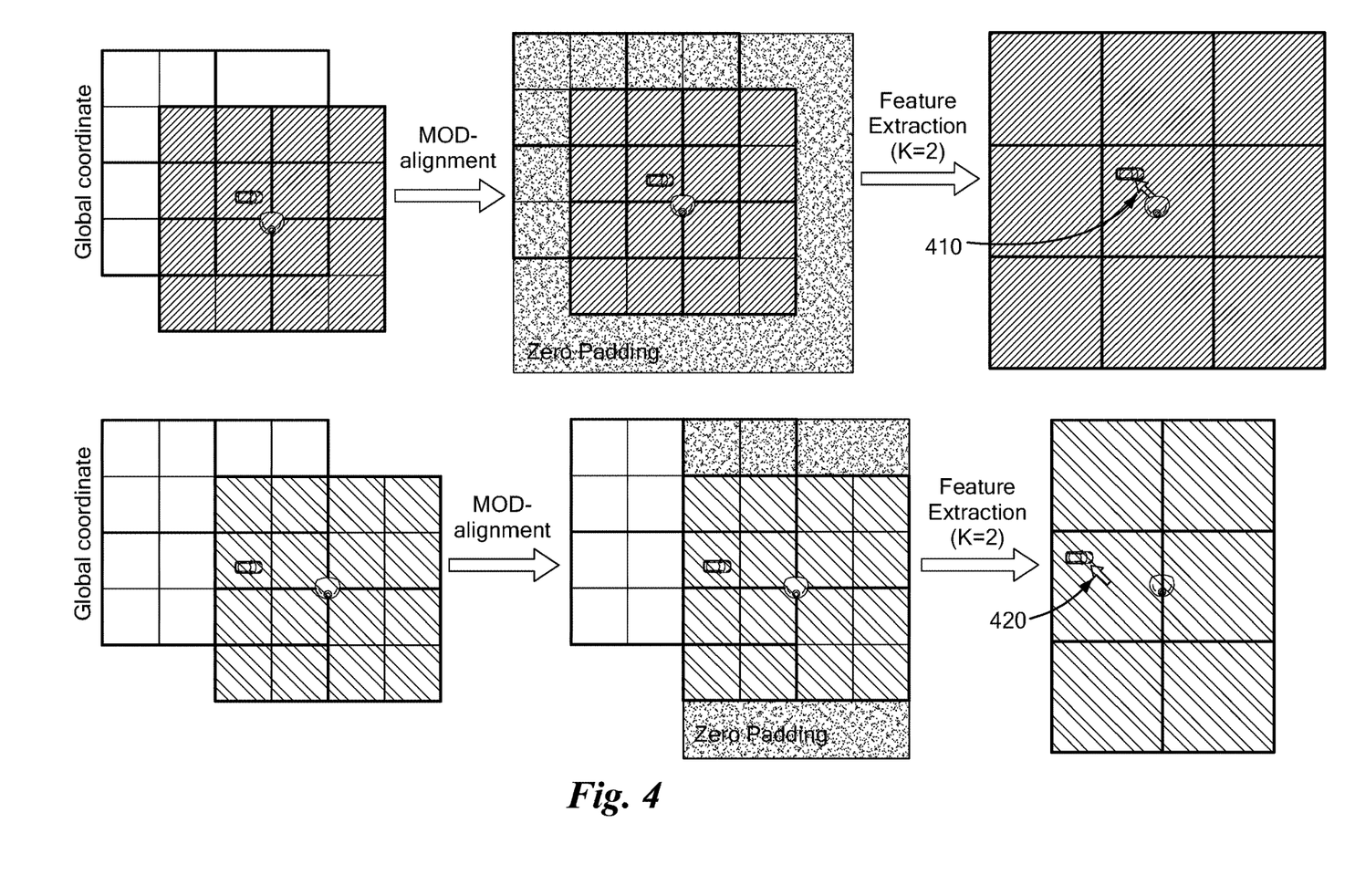
FIG. 4 is an illustration of the Translation Mod Alignment procedure mitigating the information mismatch caused by down-sampling.

$p_l$, $p_r$, $p_t$ and $p_b$ are left, right, top, bottom padding respectively. Alternatively the input image can be shifted to right and bottom by $p_l$ and $p_t$ if the user desires to transmit fixed size feature map in terms of height and width. However, this will lead to loss of information on the right and bottom side of the image. FIG. 4 illustrates an example where Translation Mod Alignment resolves the down-sampling issue.

4) Translation Mod Alignment For Voxel alignment: The introduced concept of feature sharing can also be utilized with a volumetric object detection scheme. In such design, the three-dimensional (3D) tensors (rather than 2D BEV image) are obtained from point clouds and are the input into the object detection component. However, the same Translation Mod Alignment procedure can be used to align the input 3D tensors prior to producing the 3D feature maps in order to enhance the performance of object detection. In 2D BEV images, the Translation Mod Alignment is performed along the two dimension of the input image. Similarly, the alignment procedure for 3D tensors is done along three dimensions. Without loss of generality, the same formulation for alignment along x and y, as introduced, can be applied for the third dimension.

5) Feature Extraction: After Translation Mod Alignment, the mod-aligned BEV image is fed into a CNN to acquire the feature-map of the surrounding environment. An example CNN architecture for feature extractor component is provided in table I.

6) Encoder-Decoder for transmission feature compression: The structure of feature extractor network is identical in both cooperative vehicles to project the input images of both vehicles onto an identical feature space. Additionally, the feature-maps' number of channels and consequently the size of shared data are directly dependent on the structure of the network used as feature extractor component (FEC). Reducing the number of filters at the last layer of FEC to further compress the features would result in lower object detection performance. However, the feature compression in ego-vehicles would not benefit lowering the required network capacity and will only result in lower performance. To mitigate the side effect of compression while keeping the communication load low, a CNN encoder is used for projecting (compressing) the transmitter vehicle feature maps onto a lower dimension for transmission. The produced feature-maps are fed into the encoder with a low number of filters at the last layers. A decoder, or a decoder bank, on the receiver side projects the received compressed feature-maps to FEC feature-space. The produced compressed feature-maps are transmitted along with the cooperative vehicle GPS information to other cooperative vehicles. The number of filters at the last layer of the encoder ($C_t$ in Table I) determines the size of data being shared between cooperative vehicles using our proposed approach. Therefore, the bandwidth requirement can be met by customizing the structure of encoder CNN and more specifically by tuning the filters at the last convolutional layer. The received feature maps are fed into the decoder. The last layer of the decoder should have the same number of the filters as the last layer of FEC.

This ensures both decoder and FEC to be trained to represent identical feature spaces.

FIG. 3 is an illustration of the effect of down-sampling on alignment. The vectors 310, 320 pointing to the target within the corresponding fixels are contradictory. This shows that a simple shift in the observation image would change the produced feature maps. K is the down-sampling rate.

FIG. 4 is an illustration of how the Translation Mod Alignment procedure resolves the information mismatch caused by down-sampling. The input image is padded with zero values to ensure each produced fixel represents a specific range of pixels in global coordinate system. The vectors 410, 420 pointing to the target object within both corresponding fixels are identical.

7) Global Translation Alignment: All the procedures mentioned above (except for encoder-decoder phase) also occurs at the receiver vehicle yielding the feature-map of receiver's projected point-cloud. The vehicle receiving feature-maps is referred to as an ego-vehicle and the vehicle transmitting feature-maps as a coop-vehicle. The decoded coop-vehicle's feature-map is aligned with respect to the ego-vehicle local coordinate system and accumulated with the ego-vehicle's feature-map. The second phase of global alignment is a 2D image translation transformation. The equations for translation alignment are as follows.

$$\hat{F}_c(x_f, y_f) = F_c(x_f + \Delta x, y_f + \Delta y) \quad (6)$$

$$\Delta x = \left\lfloor \frac{x_e}{s} \right\rfloor - \left\lfloor \frac{x_c}{s} \right\rfloor \quad (7)$$

$$\Delta y = \left\lfloor \frac{y_e}{s} \right\rfloor - \left\lfloor \frac{y_c}{s} \right\rfloor \quad (8)$$

Where $F_f$, $\hat{F}_f$, $(x_c, y_c)$, $(x_c, y_c)$ are the coop-vehicle's decoded feature-map, aligned coop-vehicle's decoded feature-map, coop-vehicle and ego-vehicle pixel-wise locations in global coordinate system respectively. The down-sampling rate from BEV image to feature-map is denoted by s. This rate is defined by total number of maxpool layers in the architecture (down-sampling rate).

8) Feature-Map Aggregation and Object Detection:

After decoding and globally aligning the received feature-map, the ego-vehicle's and aligned coop-vehicle's feature-maps are aggregated using an accumulation function such as element-wise summation. If the information acquired from the ego-vehicle and coop-vehicle are assumed to have the same level of importance, the accumulation function should follow symmetric property with regards to inputs.

Finally, the resulting accumulated feature-map is fed into the object detection CNN module to detect the targets in the environment. An example for the object detection module is given by the sample architecture in table I.B. AFS-COD Training Method In the previous section, the feed-forward process of AFS-COD was discussed. As it was mentioned, the system contains two sets of networks for feature extraction (FEC) with identical structure, one residing at coop-vehicle and one at ego-vehicle. Here, the technique used for training these networks is briefly explained. The symmetric property for feature accumulation imposes the networks at both vehicles to have identical parameters. For training, a single feature extractor network is fed-forward with both vehicles observations.

Therefore, the gradients in the back-propagation step are calculated with respect to both observations and the weights of the feature extractor network are updated accordingly. At the next feed-forward step, the same updated network is used for both vehicles. Assuming g to be the feature accumulation function, f to be the feature extractor function and h the encoder-decoder, function. Therefore, g can be defined as:

$$g(f(Z_1; \theta), f(Z_2; \theta)) = f(Z_1; \theta) + h(f(Z_2; \theta); \eta); \quad (9)$$

Where $Z_1$ and $Z_2$ are cooperative vehicles observations, $\theta$ is the feature extractor component parameters and $\eta$ is the encoder-decoder component parameters. Hence, the partial derivative with respect to shared parameters $\theta$ is calculated by $$\frac{\partial g(f(Z_1; \theta), f(Z_2; \theta))}{\partial \theta} = \frac{f(Z_1; \theta)}{\partial \theta} + \frac{\partial h(f(Z_2; \theta)\eta)}{\partial \theta}. \quad (10)$$

Table I is an example for a proposed framework; however, it could be replaced by another CNN based architecture:

TABLE I

The architecture of Proposed networks

| Baseline | FSCOD-NMA | FSCOD | AFS-COD |
|---|---|---|---|
| Input 832x832x3 ||||
| Feature Extraction Component ||||
| 3x3x24 Convolution Batch-Norm Leaky ReLU(0.1) ||||
| Maxpool/2 ||||
| 3x3x48 Convolution Batch-Norm Leaky ReLU(0.1) ||||
| Maxpool/2 ||||
| 3x3x64 Convolution Batch-Norm Leaky ReLU(0.1) ||||
| 3x3x32 Convolution Batch-Norm Leaky ReLU(0.1) ||||
| 3x3x64 Convolution Batch-Norm Leaky ReLU(0.1) ||||
| Maxpool/2 ||||
| 3x3x128 Convolution Batch-Norm Leaky ReLU(0.1) ||||
| 3x3x64 Convolution Batch-Norm Leaky ReLU(0.1) ||||
| 3x3x128 Convolution Batch-Norm Leaky ReLU(0.1) ||||
| Maxpool/2 ||||
| 3x3x128 Convolution Batch-Norm Leaky ReLU(0.1) ||||
| 3x3x128 | 3x3xC$_t$ | 3x3x128 ||
| — | — | Encoder ||
| — | — | 3x3x128 Conv BN Leaky ||
| — | — | 3x3x64 Conv BN Leaky ||
| — | — | 3x3x16 Conv BN Leaky ||
| — | — | 3x3xCt Conv BN Leaky ||
| — | — | Decoder ||
| — | — | 3x3x16 Conv BN Leaky ||
| — | — | 3x3x64 Conv BN Leaky ||
| — | — | 3x3x128 Conv BN Leaky ||
| Object Detection Component ||||
| 1x1x128 Convolution Batch-Norm Leaky ReLU(0.1) ||||
| 3x3x256 Convolution Batch-Norm Leaky ReLU(0.1) ||||
| 1x1x512 Convolution Batch-Norm Leaky ReLU(0.1) ||||
| 1x1x1024 Convolution Batch-Norm Leaky ReLU(0.1) ||||
| 3x3x2048 Convolution Batch-Norm Leaky ReLU(0.1) ||||
| 1x1x1024 Convolution Batch-Norm Leaky ReLU(0.1) ||||
| 1x1x2048 Convolution Batch-Norm Leaky ReLU(0.1) ||||
| 3x3x1024 Convolution Batch-Norm Leaky ReLU(0.1) ||||
| 1x1x20 Convolution ||||
| Output 52x52x20 ||||

Equation (10) can be used in chain rule in order to perform back propagation.

The same procedure for training can applied when omitting the use of the encoder-decoder for compression purposes. In such case the function g can be defined as:

$$g(f(Z1; \theta), f(Z2; \theta)) = f(Z1; \theta) + f(Z2; \theta); \quad (11)$$

The partial derivatives with respect to shared parameter $\theta$ can be calculated via equation (12).

$$\frac{\partial g(f(Z_1; \theta), f(Z_2; \theta))}{\partial \theta} = \frac{f(Z_1; \theta)}{\partial \theta} + \frac{\partial f(Z_2; \theta)}{\partial \theta}. \quad (12)$$

Where the summation in equation (12) indicates the aggregation operator.

The training scheme can be applied to any arbitrary aggregation operator such as max-out. This scheme of training is referred to as cooperative-vehicle training strategy (CVT). In prior systems, the networks were pretrained by single observations as opposed to a training strategy where time synchronized observations of cooperative vehicles are simultaneously fed to the network to attain higher performance in cooperative settings. In other words, the prior systems training scheme is not designed for cooperative systems and as one of the consequences does not consider the aggregation function as a part of training. The prior systems' training methodology is referred to as single-vehicle training strategy (SVT).

Figure 6:
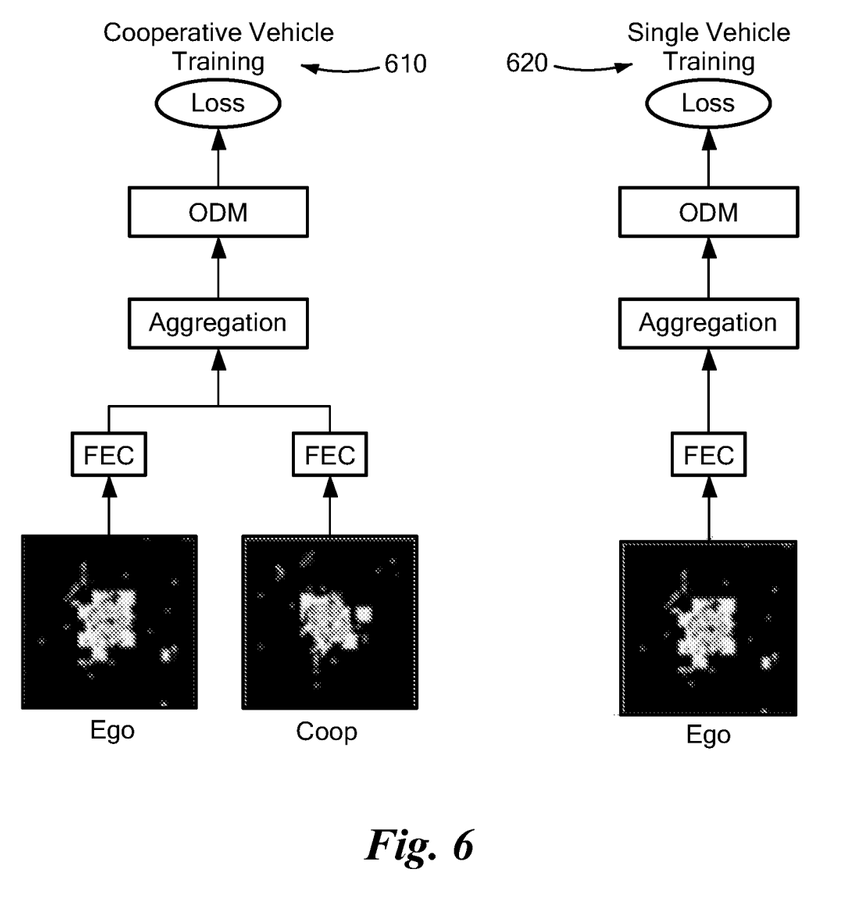
FIG. 6 shows a comparison between cooperative vehicle training and single-vehicle training.

FIG. 6 shows a comparison between cooperative vehicle training 610 and single-vehicle training 620. In cooperative vehicle training strategy 610, the observations from all vehicles are fed to the network concurrently and the gradients are calculated with respect to aggregation of the feature map with respect to all inputs.

II. Experiments and Results

In this section, first, the details of the dataset on which the proposed cooperative methods have been tested are discussed. Furthermore, some additional information about the baseline methods are provided. Finally, the section is concluded with results and evaluation.

A. Data Gathering and Simulation

No dataset is known to exist to provide simultaneous observations from the same scene for training networks in a cooperative setting. While this is a significant challenge for research on this subject, the first example of such datasets has been created using simulation tools. A dataset has been gathered using a dataset collection tool called Volony. Using Volony, the user can gather measurements such as RGBD images and LIDAR point-clouds data acquired simultaneously from cooperative vehicles. Additionally, the user has access to objects' bounding box information, labels and metadata such as vehicles' GPS information. Moreover, the characteristics of sensors can be customized and various sensors with different range and precision can be utilized.

To obtain realistic observations, vehicles have been deployed in an urban area containing objects such as buildings, trees, traffic lights. The urban environment will lead to realistic scenarios in which the observer faces complications like occlusion. In experiments, 90 vehicles were deployed in an urban area in the simulator and equipped 30 vehicles capturing synchronized LIDAR observations from the environment. The measurements are done periodically within 0.1 second intervals; in addition, every 10 seconds the vehicles are redeployed to minimize the correlation between samples. In our experiments, the vehicles are equipped with a 40 m range LIDAR device in the simulator and the size of the 2D image resulting from BEV projection is fixed at 832×832 pixels. Therefore, the image resolution is 10.4 pixels per meter (ppm). To attain fair comparison, the same set of samples were used for training of AFS-COD and baseline schemes. The selected dataset includes only frames in which at least two cooperative vehicles have measurements from one or more targets in the scene. The datasets consist of 5000 and 1000 sample frames for training and validation respectively. The setup of vehicles has been randomly reinitialized for the validation dataset to remove dependency between training and validation sets.

Figure 5A:
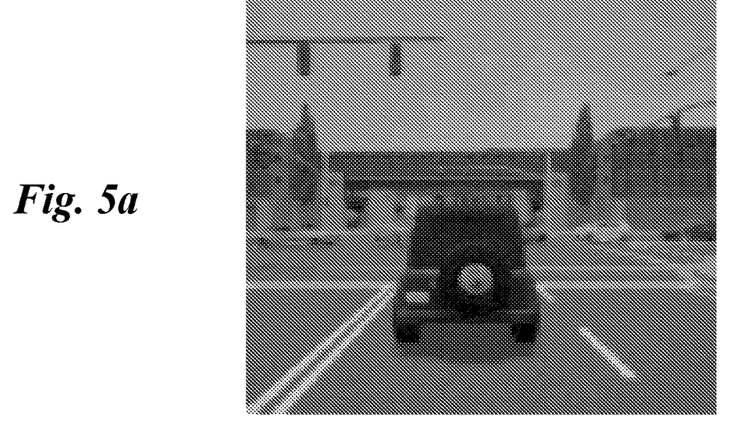
Figure 5B:
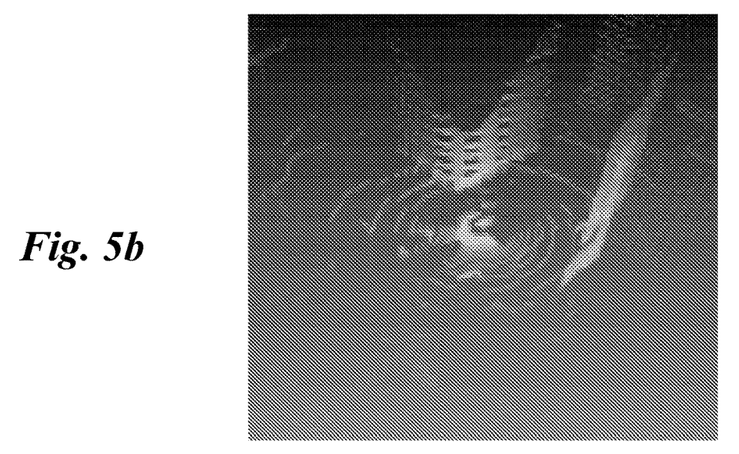
Figure 5C:
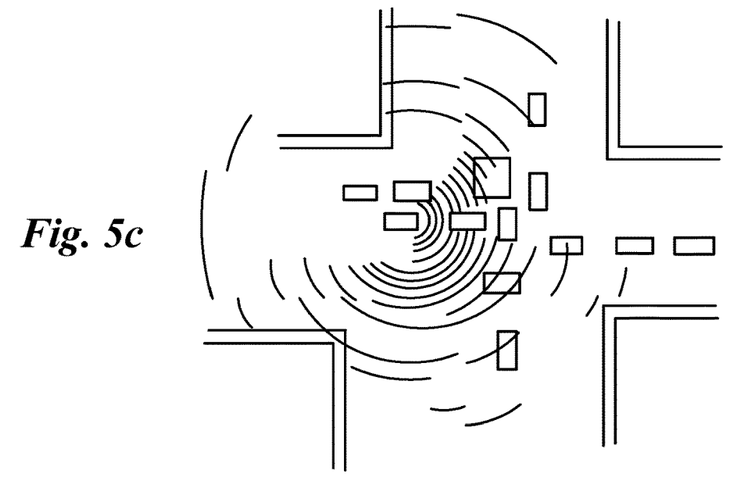

FIG. 5 illustrates the captured observations within CARLA simulator in the urban area setting; captured point-clouds from the LIDAR device are illustrated along with the corresponding BEV image and RGB camera image.

B. Baseline: Single Vehicle Object Detection and FS-COD

A single vehicle object detection method is considered along with two feature-sharing cooperative object detection method, which were proposed in previous work as baselines to evaluate the performance of AFS-COD. The design of single vehicle baseline network architecture is adapted from Complex-YOLO architecture based on some assumptions about the nature of the target objects which are true in vehicular application domain, e.g., vehicles (target objects) are on surfaces and have pre-known sizes with relatively small variations based on the class of vehicle. Therefore, by carefully choosing the number of maxpool layers, with respect to the size of vehicles and input resolution, the Complex-YOLO was modified to enhance baseline method's object detection performance. The total number of maxpool layers is determined such that the output cell's size is approximately equal to or smaller than the width of vehicles in the image. Hence, each cell can only be associated with one object in the training phase. FSCOD without Translation Mod Alignment (FSCOD-NMA) as a cooperative object detection method is considered to be the second baseline. In addition, FS-COD with Translation Mod Alignment is considered as the third baseline. All the provided results are based on experiments with 10.4 ppm resolution (LIDAR with 40 m range).

The details of the baseline network architectures is provided in Table I. It should be noted that the AFS-COD is similar to the single vehicle object detection baseline if the components corresponding to feature sharing idea are removed. Hence, the performance of the method is automatically reduced to the baseline when information shared by cooperative participants is not available.

C. Evaluation and Results

In this section, the evaluation of the architecture of one embodiment on the dataset is presented. The results of AFS-COD are compared to both baseline methods discussed in previous section. Recall and precision, As two metrics commonly used for evaluating object detection methods, are considered in this section.

Additionally, in order to have a fair comparison, the required communication load for transmitting feature-maps between entities is also considered. Hence, both AFS-COD and FS-COD methods were designed to require the same bandwidth, e.g., to transmit feature-maps with the same size and number of channels. In reality, the communication channel has limited capacity. Feature sharing concept relies on both distributed processing and observation compression.

By transmitting features instead of raw observation, an image with size of (H, W, C) is compressed into a tensor of size $(H_f, W_f, C_t)$. Therefore, the communication load is proportionate to the total number of channels. By enforcing $H_f \cdot W_f \cdot C_t < H \cdot W \cdot C$, we have ensured that the network requires less bandwidth for transmission.

Table II shows the upper bound of shared feature-maps data size per frame with respect to number of channels. It was assumed every element of the map is represented by a 32 bit single-precision floating point and the sparsity in feature maps are not considered in calculation. In experiments, transmitted feature-maps were set to have only one channel in both AFS-COD and FS-COD methods ($C_t$=1).

Figure 7:
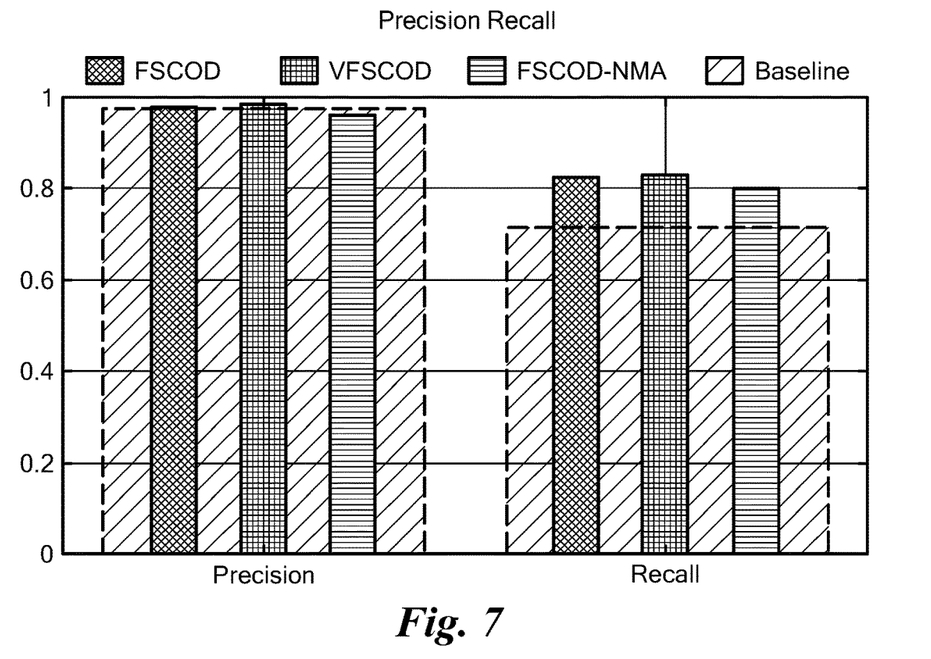
FIG. 7 illustrates detection precision and recall of Single vehicle and FS-COD baselines.

FIG. 7 illustrates Detection precision and recall of Single vehicle and FS-COD baselines with and without Translation Mod Alignment along with AFS-COD results. FIG. 7 provides the comparison of detection precision and recall for single vehicle baseline and FS-COD with Translation Mod Alignment and FS-COD without Translation Mod Alignment (FSCOD-NMA) along with AFS-COD results, the feature-map channel size for both FS-COD and AFS-COD architectures is set to be one. In all cases, the detection intersection-over-union (IoU) and object confidence threshold are 50%. The reported recall is calculated based on all existing targets within the LIDAR range of the ego vehicle, e.g., 40 m. Therefore, the targets that are fully occluded are considered in the calculation of recall and precision. The results show AFS-COD improves recall while maintaining the precision and keeping the required communication capacity as low as 10 KB per frame.

Figure 8:
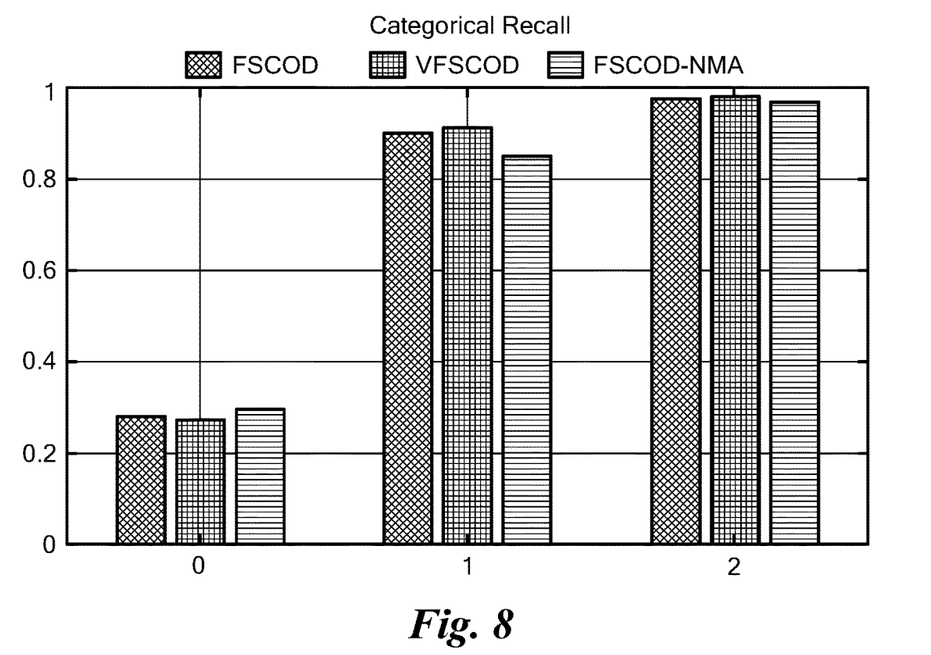
FIG. 8 shows detection recall of baseline FS-COD with and without Translation Mod Alignment and AFS-COD for different categories.

FIG. 8 shows Detection recall of baseline FS-COD with and without Translation Mod Alignment and AFS-COD for different categories. Each category determines how many cooperative vehicle would be able to detect the target if they used the baseline method.

FIG. 8 illustrates a more in-depth approach to observe how object detection benefits from AFS-COD. The figure shows the recall of AFS-COD in different scenarios based on baseline detection output. The targets in the validation data have been partitioned into three categories based on baseline performance. Each category determines how many cooperative vehicles would be able to detect the target if they used the single vehicle baseline method. In other words, the members of category 0, 1 and 2 are targets in the area that are detectable by neither cooperative vehicles, exclusively one cooperative vehicle and both cooperative vehicles using single vehicle baseline method respectively. On average, AFS-COD can detect 28% of objects where both vehicles are unable to detect. Additionally, in category 1, AFS-COD has remedied more than 90% of situations where cooperative vehicles had no consensus on their inferences. Finally, category 2 results guarantee that AFS-COD does not have detrimental effect on object detection in more than 99% of the situations.

TABLE II

Shared Features Data Size

| TX-Channel | 10.4 ppm resolution |
|---|---|
| 1 | 10 KB |
| 2 | 20 KB |
| 4 | 40 KB |
| 8 | 80 KB |
| 16 | 160 KB |
| 32 | 320 KB |
| 64 | 640 KB |

Figure 9A:
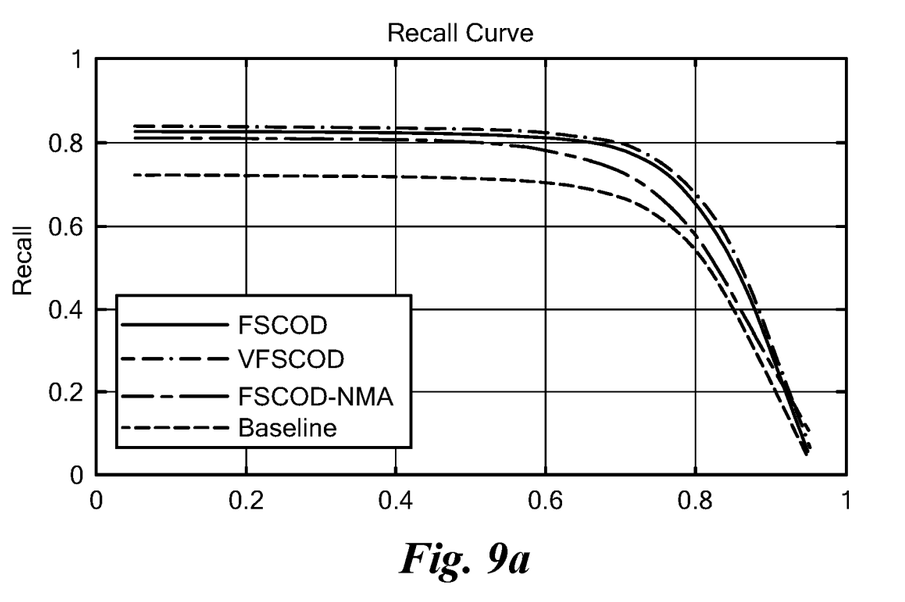
Figure 9B:
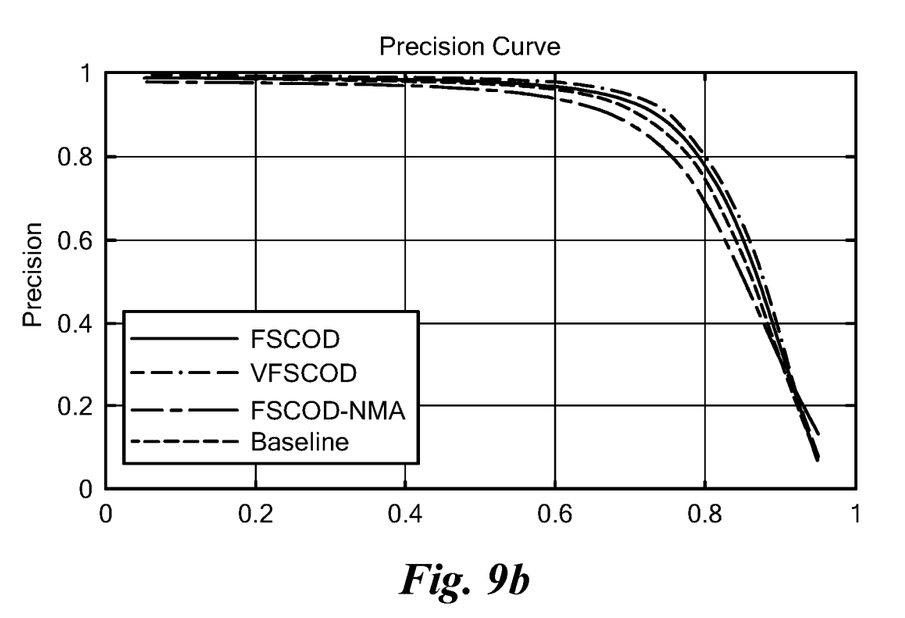

FIG. 9 illustrates detection (FIG. 9a) recall and (FIG. 9b) precision of single vehicle and FS-COD baselines and AFS-COD versus IoU threshold. The IoU threshold was incrementally increased to compare the localization performance of AFS-COD with baseline methods. As it is clearly demonstrated, AFS-COD maintains its superior performance even at very large IoU thresholds compared to baseline methods which shows its higher performance not only in detecting but also in localizing the target objects.

Various embodiments may incorporate aspects seen in prior art, such as BEV projection methods. However, the prior art fails to describe other aspects such as the Translation Mod Alignment, the architecture to enable processing of shared feature maps with different channel sizes.

Additionally, further embodiments may include other features than those described. The Translation Mod Alignment can either be applied to point cloud, BEV 2D image or 3D tensor input data. Also, a 2D convolution neural networks can be replaced by 3D convolutional neural networks. Consequently, BEV 2D image projection can be replaced with point cloud to 3D tensor projector where the value of each voxel in 3D tensor represent the number of captured points in point clouds existing in the coordinate represented by the voxel. The architecture of Neural network may also function under the condition that the output of the layer prior to feature map transmission produce 2D/3D feature map. Furthermore, the number of channels for the output of the BEV projector can vary and can be more or less than 3.

Various operations described are purely exemplary and imply no particular order. Further, the operations can be used in any sequence when appropriate and can be partially used. With the above embodiments in mind, it should be understood that additional embodiments can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described that form part of the presently disclosed embodiments may be useful machine operations. Various embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

The foregoing description has been directed to particular embodiments. However, other variations and modifications may be made to the described embodiments, with the attainment of some or all of their advantages. Modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

What is claimed is:

1. A method for object detection by cooperative vehicles sharing data comprising:
   aligning point-clouds obtained by a sensor device with respect to a vehicles' heading and a predefined global coordinate system;
   after the point-clouds are globally aligned with respect to rotation, projecting the aligned point-clouds onto a 2D/3D image plane to produce feature-maps and to generate an image/tensor having one or more channels, wherein each channel provides a density of reflected points at a specific height bin
   generating fixels, which represent pixels produced in feature-maps, wherein each fixel in a feature-map represents a set of pixel coordinates in an input image and consequently represents an area of the environment in a global coordinate,
   modifying the image/tensor so the fixels represent a predetermined range of global coordinates by applying Translation Mod Alignment on BEV images/tensors prior to being fed to the network;
   performing Translation Mod Alignment to the images/tensors;
   after Translation Mod Alignment, the mod-aligned images/tensors are fed into an artificial neural network (ANN) to acquire a feature-map of a surrounding environment;
   using an ANN encoder to project and/or compress transmitter vehicle feature maps onto a lower dimension for transmission and using a decoder on a receiver side to project the received compressed feature-maps to FEC feature-space;
   at an ego-vehicle, decoding a received feature-map, aligning the received feature-map with respect to an ego-vehicle local coordinate system and accumulating the received feature-map with an ego-vehicle's feature-map; and
   feeding the resulting accumulated feature-map into an object detection ANN module to detect targets in the surrounding environment.

2. The method of claim 1, wherein the sensor device comprises at least one light detection and ranging (LIDAR) sensor.

3. The method of claim 1, wherein the sensor device comprises a depth sensor configured to produce depth information.

4. The method of claim 3, wherein the depth sensor comprises at least one of: a radar and a depth camera.

5. The method of claim 1, wherein projecting the aligned point-clouds onto a 2D/3D image plane comprises using one of: a bird-eye view (BEV) projector unit, and a point cloud to 3D tensor projector.

6. The method of claim 1, wherein modifying the image/tensor comprises at least one of padding and shifting the image/tensor.

7. The method of claim 1, further comprising determining a vector indicating relative locations and orientations of objects with respect to an observer in addition to class and confidence of object detection based at least in part on information embedded in features of the feature map.

8. The method of claim 1, wherein accumulating the received feature-map with an ego-vehicle's feature-map comprises accumulating the ego-vehicle's feature-map and aligning received feature-maps using a general aggregation operator to combine multiple feature-maps to a single feature map.

9. The method of claim 8, wherein the general aggregation operator is an element-wise summation.

10. The method of claim 1, wherein the ANN is a convolutional neural network (CNN).

11. The method of claim 1, wherein the ANN is configured to transform an input image/tensor to a domain or feature space.

12. The method of claim 1, wherein the is a 2D image plane and the image/tensor is a bird-eye view (BEV) image.

13. A non-transitory computer-readable medium storing instructions that, when executed by one or more processors, cause the one or more processors to perform operations comprising:
   aligning point-clouds obtained by a sensor device with respect to a vehicle's heading and a predefined global coordinate system;
   after the point-clouds are globally aligned with respect to rotation, projecting the aligned point-clouds onto a 2D or 3D image plane to produce feature-maps and to generate an image or tensor having one or more channels, wherein each channel provides a density of reflected points at a specific height bin;
   generating fixels, which represent pixels produced in feature-maps, wherein each fixel in a feature-map represents a set of pixel coordinates in an input image and consequently represents an area of the environment in a global coordinate system;
   modifying the image or tensor so the fixels represent a predetermined range of global coordinates by applying Translation Mod Alignment on bird's-eye view (BEV) images or tensors prior to being fed to the network;
   performing Translation Mod Alignment to the images or tensors;
   after Translation Mod Alignment, feeding the mod-aligned images or tensors into an artificial neural network (ANN) to acquire a feature-map of a surrounding environment;
   using an ANN encoder to project and/or compress transmitter vehicle feature maps onto a lower dimension for transmission and using a decoder on a receiver side to project the received compressed feature-maps to feature embedding coordinates (FEC) feature-space;
   at an ego-vehicle, decoding a received feature-map, aligning the received feature-map with respect to an ego-vehicle local coordinate system, and accumulating the received feature-map with an ego-vehicle's feature-map; and
   feeding the resulting accumulated feature-map into an object detection ANN module to detect targets in the surrounding environment.

14. The non-transitory computer-readable medium of claim 13, wherein the sensor device comprises at least one light detection and ranging (LIDAR) sensor.

15. The non-transitory computer-readable medium of claim 13, wherein the sensor device comprises a depth sensor configured to produce depth information.

16. The non-transitory computer-readable medium of claim 15, wherein the depth sensor comprises at least one of: a radar and a depth camera.

17. The non-transitory computer-readable medium of claim 13, wherein projecting the aligned point-clouds onto a 2D or 3D image plane comprises using one of: a bird-eye view (BEV) projector unit, and a point cloud to 3D tensor projector.

18. The non-transitory computer-readable medium of claim 13, wherein modifying the image or tensor comprises at least one of padding and shifting the image or tensor.

19. The non-transitory computer-readable medium of claim 13, further comprising determining a vector indicating relative locations and orientations of objects with respect to an observer in addition to class and confidence of object detection based at least in part on information embedded in features of the feature map.

20. The non-transitory computer-readable medium of claim 13, wherein accumulating the received feature-map with an ego-vehicle's feature-map comprises accumulating the ego-vehicle's feature-map and aligning received feature-maps using a general aggregation operator to combine multiple feature-maps to a single feature map.

21. The non-transitory computer-readable medium of claim 20, wherein the general aggregation operator is an element-wise summation.

22. The non-transitory computer-readable medium of claim 13, wherein the ANN is a convolutional neural network (CNN).

23. The non-transitory computer-readable medium of claim 13, wherein the ANN is configured to transform an input image or tensor to a domain or feature space.

24. The non-transitory computer-readable medium of claim 13, wherein the 2D image plane and the image or tensor is a bird-eye view (BEV) image.

\* \* \* \* \*